3,189,334
AERATING DEVICE
Robert Wayne Bell, 723 N. Myers St., Burbank, Calif.
Filed Oct. 4, 1963, Ser. No. 314,064
1 Claim. (Cl. 261—93)

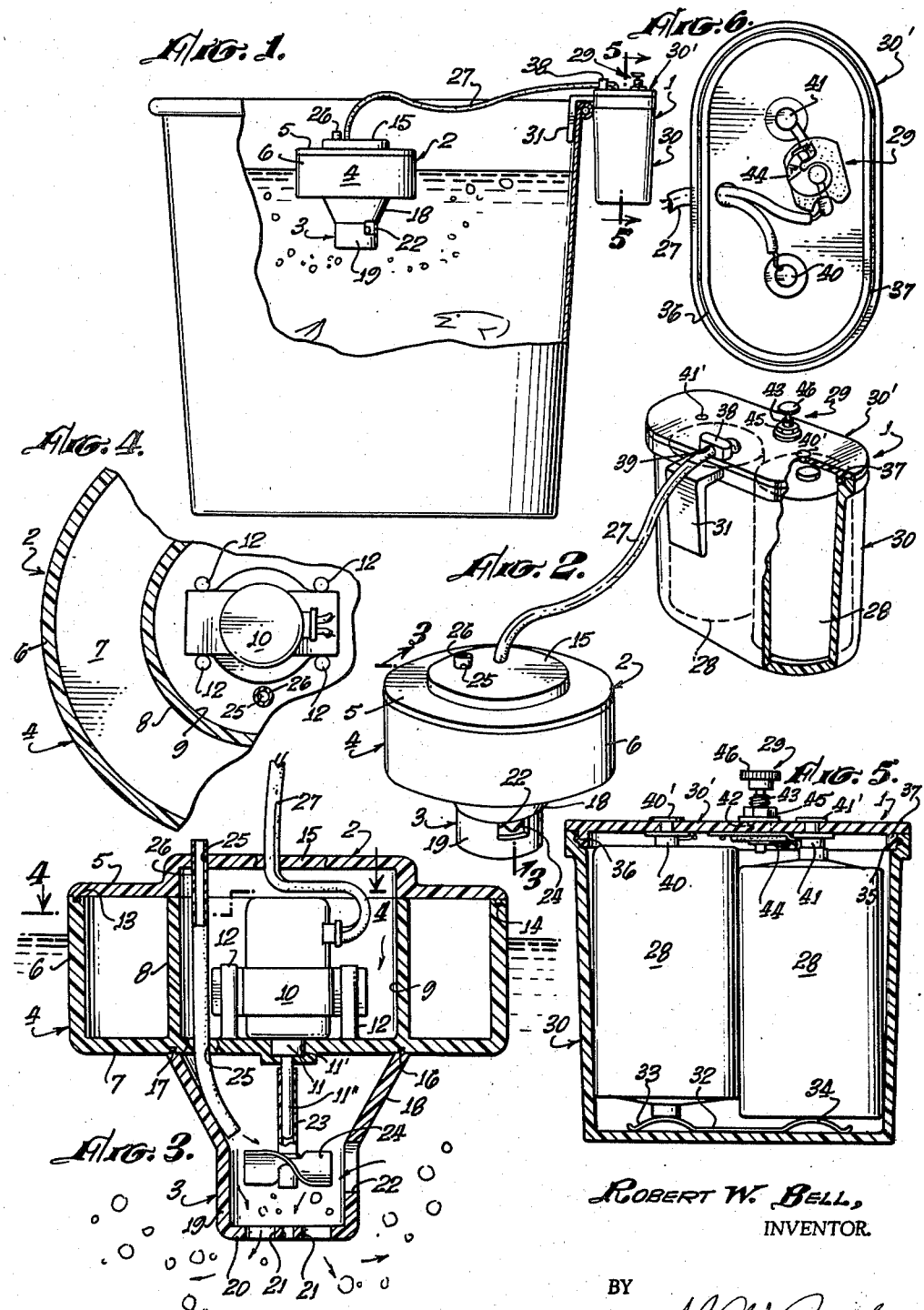

This invention relates to means for aerating the water in which minnows or other fish may be kept alive.

Fishermen using minnows for bait are constantly faced with the necessity of changing the water in which the minnows are kept to keep them alive since the disproportionate number of minnows to the quantity of water quickly exhausts the available supply of oxygen in the water. The usual practice is to change the water from time to time and this is both an irksome job and sometimes results in the accidental loss of minnows overboard. A number of proposals have been made for replenishing the oxygen in the water and heretofore, these proposals have generally resulted in complicated, cumbersome and relatively expensive devices usually involving pumping of water out of the container and allowing it to cascade back into the container.

With the foregoing considerations in mind, the objects of the present invention are: to provide an aerating device which can float in the water in the minnow bucket or other container and which includes means for drawing air into the water with resultant replenishment of the oxygen supply; which is able to be powered by flashlight batteries; and which is simple in construction, economical to manufacture, and effective for its intended purpose.

With the foregoing objects in view together with such additional objects and advantages as may subsequently appear, the invention resides in the parts, and in the construction, combination and arrangement of parts described, by way of example, in the following specification of a presently preferred embodiment of the invention, reference being had to the accompanying drawings which form a part of said specification and in which drawings:

FIG. 1 is a side elevational view of a device constituting a presently preferred embodiment of the invention in position of use on a minnow bucket with the aerating component or unit floating in the water in the bucket and the battery and switch unit detachably mounted on the rim of the bucket; a portion of the side of the bucket being broken away to better disclose the invention, FIG. 2 is an enlarged perspective view of the device, FIG. 3 is a further enlarged, medial sectional view of the aerator unit of the device as taken on the line 3—3 of FIG. 2, FIG. 4 is a fragmentary top plan sectional view taken on the line 4—4 of FIG. 3, FIG. 5 is an enlarged medial sectional view of the battery and switch unit of the invention taken on the line 5—5 of FIG. 1, and FIG. 6 is an enlarged scale, bottom plan view of the cover of the battery case unit.

Referring to the drawings, the illustrated embodiment of the invention comprises a battery case and switch unit 1 and an aerator unit 2. The aerator unit body structure is generally circular in plan and comprises from bottom to top thereof a pump housing 3, a combined float and motor housing 4, and a cover 5; said aerator structure parts being preferably formed as plastic moldings and being cemented together to form a monolithic body structure.

The float and motor housing component 4 is shaped generally as a circular pan having a depth slightly less than the radial dimension thereof and including an outer wall 6 and a bottom wall 7. At about midway between said outer wall and the axial line about which said outer wall is generated, the component 4 is provided with an inner wall 8 coaxially disposed with respect to the said axial line and combining with the bottom wall 7 to define a cavity 9 within which a vertical axis electric motor 10 is disposed with the shaft bearing 11 thereof seated in a recess 11' in the bottom wall 7 and the motor shaft 11" projecting through a hole in the bottom wall 7 in the axial line of said component 4; the frame of said motor being engaged by vertical studs 12 integrally formed with the bottom wall 7 to hold it against turning. The top edge of the wall 6 is provided with a groove 13 which is engaged by a rib 14 on the underside of the cover component 5; said cover contacting the top edge of the inner wall 8 to seal off the toroidal space defined by the cover 5, the walls 6 and 8 and the bottom wall 7, whereby the aerator unit is rendered buoyant. The cover 5 is also formed with a centrally disposed shallow dome portion 15 which is peripherally coextensive with the motor housing cavity 9.

The under side of the bottom wall 7 is provided with a circular groove 16 preferably concentric with the axial line of the body component 4; said groove being engaged by a rib 17 on the upper edge of the pump housing component 3 which is also circular in plan view said components being cemented together as a unit incident to the assembly thereof as will be later referred to. From the upper end thereof, the side wall of the pump housing tapers inwardly and downwardly as at 18 to about half the diameter of the upper end thereof and thence extends vertically downwardly as at 19 for substantially an equal distance terminating in a bottom wall 20 provided with openings 21, 21 extending therethrough. Additionally, the vertical side wall portion 19 is provided with a large rectangular opening 22. Mounted on the depending end of the motor shaft 11" is the upper tubular end of an impeller shaft 23 having a two-blade impeller 24 at the lower end thereof which is disposed within the space defined by the vertical wall 19 and opposite the opening 21 therein; said impeller blades being so slanted that as they are rotated by the motor they tend to expel water and air through the openings 21 in the bottom wall 20. The cover 5 and the bottom wall 7 within the inner face of the inner wall 8 are provided with axially aligned openings 25, 25 disposed at least substantially diametrically opposite the openings 21 in the housing wall 19 and mounted in said openings is a tube 26 having the upper end thereof extending above the dome surface 15 of the cover and having the lower end thereof terminating closely above the path of travel of the blades of the impeller 24. Additionally, the dome portion of the cover is provided with an opening through which a pair of flexible electrical conductors 27 contained in a single insulating means extend from batteries 28, 28 in the battery case unit 1 to the motor 10 through an interposed, manually operable switch means 29 to which further reference will be made.

The battery case unit 1 comprises two plastic moldings including a container component 30 adapted to contain a pair of flashlight cells 28, 28 in side-by-side relation and a cover 30'; said container having an integrally formed hook 31 at one side of the upper edge thereof adapted to engage the rim of a minnow bucket or the like with the container resting against the outer surface of the bucket. Mounted in the bottom of the container 30 is a resilient metal strip 32, 32 having upwardly and thence downwardly arched ends 33 and 34 adapted to be engaged by the center or what is commonly referred to as the "top" of one of the cells 28 and the bottom of the other cell 28 whereby the cells are electrically connected in series relation.

The inner upper edge of the container is provided with a peripheral groove 35 which affords "snap-in" engagement with a complementary rib 36 carried by a flange 37 depending from the under side of the cover 30'. The cover 30' at one side thereof is provided with an upstanding lug element 38 having an opening extending therethrough through which the conductors 27 extend and adjacent to said lug element, the cover is provided with an opening 39 through which the conductors 27 enter to the under side of the cover. The under side of the cover is provided with a first contact point 40 secured thereto by hollow rivet means 40' and to which one of the leads 27 is attached by suitable means as, for example, soldering; said contact point being disposed in the axial line of one of the cells 28 so that the pressure exerted on the cell by the snap-in cover causes electrical contact of the cell both with the end of the spring 32 which is stressed when the cover is snapped into place and with the contact 40. The cover is provided with a second contact point 41 secured thereto by a second hollow rivet means 41' disposed in the axial line of the other of the cells 28 and said other cell is similarly brought into electrical contact both with the opposite end of the spring 32 and the contact point 41 by the snapping in of the cover.

The cover 30' is provided with an opening 42 disposed slightly offset from the center thereof and through which opening the hollow, exteriorly threaded mounting shank 43 of the switch assembly 29 extends with the contact means of the switch assembly disposed against the under side of the cover. A nut 45 at the outer surface of the cover secures the switch in position thereon. The hollow mounting shank affords bearing support for a rotatable shaft carrying a hand knob 46 by rotation of which the switch contacts are optionally closed or opened. One terminal of said switch unit is connected to the battery contact point 41 and the other terminal is connected to the other of the conductors 27. The switch, per se, is a standard article of commerce and detailed description of the construction thereof is not believed essential to the understanding of the invention.

In assembling the aerator unit, the motor is installed in the component 4 with the shaft projecting through the bottom wall 7 thereof and the end of the tube 26 is inserted in one of the holes 25 which is in the bottom wall 7 of said component. The leads 27 attached to the motor are extended through the openings therefor in the cover and the upper end of the tube 26 is projected through the hole 25 in the cover 5 and the cover can then be cemented in place on the body unit. The impeller shaft is mounted on the motor shaft and secured by any appropriate means as, for example, by soldering, after which the pump housing unit can be cemented to the bottom wall 7 care being taken to locate the opening 22 of the pump housing approximately diametrically opposite the tube 26.

Assuming that batteries are in the battery case and the switch 29 is in open position, the aerator unit can be dropped into the water in the minnow bucket. The toroidal space around the motor housing affords buoyancy so that it will float in approximately the position shown in FIG. 1. Incidentally, since the pump housing is sealed to the bottom of the motor housing unit an air space exists at the upper end of the pump housing thus preventing water from entering the motor housing along the shaft bearing. When the switch is closed and the motor is operated, the speed of rotation of the impeller blades is such as to produce pronounced cavitation in the limited amount of water in the lower end of the pump housing and this cavitation is supplied with air being received through the tube 26 and the combined air and water are expelled mainly downwardly through the openings 21 there being some discharge of air out of the side wall opening 22. After a few seconds operation, the water in the bucket is sufficiently aerated to satisfy the demands of the minnows for an hour or more after which the motor can be started again and the water replenished with oxygen. Thus it is that there has been provided a simple compact unit which is effective to aerate the water in minnow buckets, which cannot harm the minnows by contact with moving parts, which is economical in construction and generally effective for its intended purpose and while a presently preferred embodiment of the invention has been disclosed by way of example, the invention is not to be deemed to be limited to the precise details so disclosed. Also, while the device has been shown in use in a minnow bucket, the invention is not to be deemed to be limited to that use and it can be used in aquariums or wherever it may be employed advantageously. Accordingly, it will be understood that the invention includes all such changes and modifications in the parts, and in the construction, combination and arrangement of parts as shall come within the purview of the appended claims.

I claim:

In an aerating means for a minnow bucket or like container of live fish adapted to contain water, a hollow buoyant body structure including a bottom wall and a perimetrical side wall; said bottom wall being normally disposed below the plane of the top surface of the water in said container, an electric motor mounted on said bottom wall and enclosed within said hollow body, a rotatable, bladed impeller disposed in the water beneath the bottom wall of the portion of said hollow body in which said motor is housed, a drive shaft extending from said motor through said bottom wall portion and carrying said impeller, a housing formed as a part of said hollow body and surrounding said impeller and having openings for the ingress of water and egress of water and air; the blades of said impeller providing means to produce cavitation when said impeller is rotated by said motor, an air conduit means formed through said hollow body and extending from a point thereon above the water to a point in close adjacency to the portion of the path of travel of the blades of said impeller in which cavitation is caused, a power source component comprising a battery container having battery engaging contacts and support means affording detachable mounting of said battery container on the side of a minnow bucket or other container of live fish and a manually operable switch for controlling the supply of power from battery means contained in said battery container, and flexible conductor means connecting battery means in said battery container and said switch with said motor.

References Cited by the Examiner

UNITED STATES PATENTS

| | | |
|---|---|---|
| 1,864,149 | 6/32 | Rockwell. |
| 2,194,037 | 3/40 | Thuma. |
| 2,515,538 | 7/50 | Wall. |
| 2,827,268 | 3/58 | Staaf. |
| 2,865,618 | 12/58 | Abell. |
| 2,919,120 | 12/59 | Baxter. |

HARRY B. THORNTON, *Primary Examiner.*

ROBERT R. WEAVER, *Examiner.*